(12) United States Patent
Lee

(10) Patent No.: US 7,719,430 B2
(45) Date of Patent: May 18, 2010

(54) APPARATUS AND METHOD FOR THE VIRTUAL FENCING OF AN ANIMAL

(75) Inventor: Caroline Lee, Armidale (AU)

(73) Assignee: Commonwealth Scientific and Industrial Research Organisation, Campell, Act (AU)

( * ) Notice: Subject to any disclaimer, the term of this patent is extended or adjusted under 35 U.S.C. 154(b) by 375 days.

(21) Appl. No.: 11/632,062

(22) PCT Filed: Jul. 18, 2005

(86) PCT No.: PCT/AU2005/001056
§ 371 (c)(1), (2), (4) Date: Jan. 10, 2007

(87) PCT Pub. No.: WO2006/007643
PCT Pub. Date: Jan. 26, 2006

(65) Prior Publication Data
US 2008/0035072 A1    Feb. 14, 2008

(30) Foreign Application Priority Data
Jul. 16, 2004   (AU) .............................. 2004903957

(51) Int. Cl.
G08B 23/00 (2006.01)
(52) U.S. Cl. ............... 340/573.3; 340/573.1; 340/573.4
(58) Field of Classification Search .............. 340/573.3, 340/573.4
See application file for complete search history.

(56) References Cited

U.S. PATENT DOCUMENTS

| 4,898,120 | A | | 2/1990 | Brose |
| 5,067,441 | A | | 11/1991 | Weinstein |
| 5,241,923 | A | | 9/1993 | Janning |
| 5,408,956 | A | | 4/1995 | Quigley |
| 5,636,597 | A | | 6/1997 | Van Curen et al. |
| 5,787,841 | A | * | 8/1998 | Titus et al. ................... 119/721 |
| 5,791,294 | A | | 8/1998 | Manning |
| 5,857,433 | A | * | 1/1999 | Files ........................ 340/573.3 |
| 5,868,100 | A | * | 2/1999 | Marsh ..................... 340/573.3 |
| 6,095,092 | A | | 8/2000 | Chou |

(Continued)

FOREIGN PATENT DOCUMENTS

WO    2000/057692    10/2000

OTHER PUBLICATIONS

International Search Report for PCT/AU2005/001056 mailed Aug. 26, 2005.

(Continued)

*Primary Examiner*—Eric M Blount
(74) *Attorney, Agent, or Firm*—Nixon & Vanderhye PC

(57) ABSTRACT

Virtual fencing of an animal includes a microprocessor for continuously determining the position of an animal relative to a target and whether the animal is moving relative to the target. A stimulus unit applies a sensory stimulus to the animal in response to signals received from the microprocessor. The microprocessor is programmable such that if the distance between the animal and the target is less than a predetermined distance and if the animal is moving in a direction towards the target a stimulus is applied to the animal and the stimulus is withdrawn when the animal either stops, retreats from the target, or accelerates while the distance between the animal and the target is less than the predetermined distance.

32 Claims, 2 Drawing Sheets

U.S. PATENT DOCUMENTS

| | | | |
|---|---|---|---|
| 6,232,880 B1 | 5/2001 | Anderson et al. | |
| 6,487,992 B1 * | 12/2002 | Hollis | 119/712 |
| 6,581,546 B1 * | 6/2003 | Dalland et al. | 119/712 |
| 7,034,695 B2 * | 4/2006 | Troxler | 340/573.4 |
| 7,360,505 B2 * | 4/2008 | Gerig et al. | 340/573.3 |
| 7,409,924 B2 * | 8/2008 | Kates | 119/720 |
| 2004/0066298 A1 | 4/2004 | Schmitt et al. | |
| 2004/0070508 A1 | 4/2004 | Bach et al. | |
| 2005/0122224 A1 * | 6/2005 | Lunz | 340/573.4 |
| 2007/0096929 A1 * | 5/2007 | Bach et al. | 340/573.3 |

OTHER PUBLICATIONS

Australian Search Report for AU 2004903957 mailed Oct. 7, 2004.

Comis, *The Cyber Cow Whisperer and His Virtual Fence*, Agricultural Research, Nov. 2000, pp. 4-7.

Quigley et al., *Livestock Control with Electrical and Audio Stimulation*, Rangelands 12(3), Jun. 1990, pp. 152-155.

Tiedemann et al., *Electronic (Fenceless) Control of Livestock*, U.S. Dept. of Agriculture, Research Paper PNW-RP-510, Jan. 1999, 23 pages.

Examination Report dated Nov. 3, 2008 in NZ Patent Application No. 552437.

Extended European Search Report and communication re same dated Feb. 9, 2010 in EP05760739.

* cited by examiner

APPARATUS AND METHOD FOR THE VIRTUAL FENCING OF AN ANIMAL

This application is the US national phase of international application PCT/AU2005/001056 filed 18 Jul. 2005, which designated the U.S. and claims benefit of AU 2004903957 filed 16 Jul. 2004, the entire contents of each of which are hereby incorporated by reference.

BACKGROUND

1. Technical Field

The invention concerns an apparatus and a method for the virtual fencing of an animal.

2. Related Art

Traditionally, physical fences have been used to contain livestock within defined areas. More recently, devices have been manufactured for attachment to animals. Some devices use the application of auditory stimuli as a precursor to electrical stimuli to control the spatial location of the animal. However animals do not readily discriminate between the stimuli.

Other devices can be problematic in that the animal does not know in which direction to move to escape the application of stimuli. One solution has been to provide separate stimuli to each side of the head of the animal to steer the animal however this adds to the complexity of the device, and may limit fitting options. Other devices provide continual stimuli together with an override feature designed to cause the stimulus to an animal to stop when the animal for some reason is unable to leave the exclusion area. However such devices inhibit a desired response and may compromise the welfare of the animal. Moreover, such devices do not take into consideration how animals learn and behave.

BRIEF SUMMARY

In a first aspect, the invention is an apparatus for the virtual fencing of an animal comprising:

a microprocessor for continuously determining the position of an animal relative to a target and to determine whether the animal is moving relative to the target; and a stimulus unit for applying a sensory stimulus to, the animal in response to signals received from the microprocessor;

wherein the microprocessor is programmable such that if the distance between the animal and the target is less than a predetermined distance and if the animal is moving in a direction towards the target a stimulus is applied to the animal and the stimulus is withdrawn when the animal either stops, retreats from the target, or accelerates whilst the distance between the animal and the target is less than the predetermined distance.

The aminal's acceleration may be positive or negative. The animals acceleration may occur with, or without, a change in direction.

Retreating from the target may include backing up and/or turning a direction away from the target.

The microprocessor may execute software to determine when to apply the stimulus and when to remove the application of the stimulus. The software may be executed to determine one or more of whether a stimulus is to be applied, at what intensity to apply the stimulus, and what type of stimulus is to be applied.

The determination of whether a stimulus is to be applied and/or when to remove the stimulus may be based on the animal's response to the stimulus. The response may be real-time. Determination criteria may be modified based on the animal's response to prior removal of stimuli. This may be effected by use of a control algorithm which employs pattern recognition.

The apparatus may include a wireless receiver. The microprocessor may operate in conjunction with the wireless receiver, for example, but not limited to, a global positioning system (GPS) receiver or radio receiver for receiving information relating to the position of the animal relative to the target. An advantage of using GPS, or the like, is that an adequate level of precision of the position of the animal may be obtained.

The apparatus may include one or more accelerometers. The microprocessor may operate in conjunction with the or each accelerometer. The use of an accelerometer advantageously detects small changes in the animal's velocity. The accelerometer may in addition provide an indication of the gait of the animal. A plurality of accelerometers may be provided depending on the orientation of the apparatus. The output of the accelerometer(s) may be transmitted through an analog bandpass filter. The output from the analog bandpass filter may be converted into a digital signal in an analog to digital converter. The accelerometer(s) may provide a pulsewidth modulated signal to the microprocessor.

Optionally, or in addition, the microprocessor may operate in conjunction with a magnetic sensor, an electronic compass, or the like.

One or more of the above embodiments advantageously increases the resolution of the animal's location.

The microprocessor may operate in conjunction with a remote processor for controlling the application of the stimulus. A signal output from the remote processor may be transmitted to the microprocessor via a wireless link.

The apparatus may include memory associated with the microprocessor to store data. Data may include, but not be limited to, real time measurements from the GPS, accelerometer(s) and magnetic sensor or electronic compass, when a stimulus has been applied, at what intensity a stimulus has been applied, what type of stimulus has been applied and how frequently a stimulus has been applied.

The data may include a historical record of the animal's response to the application of the stimulus.

Other programmable parameters may include the predetermined distance, animal type, stimulus intensity and stimulus type. Parameters may be programmed via a wireless link.

The stimulus may be any one or more of, but not limited to, an electrical stimulus, an audible stimulus, a vibrational stimulus, or pinching or pricking of the animal's skin.

The intensity of the stimulus may vary depending on the type of animal which is being controlled.

The target may be a stationary target such as an imaginary boundary, or a moving, or potentially moving target such as another animal. In the case where the target is for instance an imaginary, such as a line indicative of where a fence would be traditionally placed, the microprocessor is operable to determine the shortest distance between the animal and the line.

The apparatus may further comprise a power source. The power source may be selected from one of a replaceable battery pack, a rechargeable battery, a power input terminal, an AC power supply, and a DC power supply.

The invention is not limited to the location of the apparatus relative to the animal. For instance the apparatus may be worn around the neck of the animal. Optionally the apparatus may be fitted to, or incorporated into an ear tag.

The apparatus, as well as being suitable for the virtual fencing of an animal may be suitable for ensuring that two or more animals are kept a predetermined distance apart. This distance may depend on a variety of factors such as the type and number of animals and the area designated for the animals. For instance, the apparatus may be applied to two bulls, such that they can be kept within the same confinement and can still come within close proximity to each other without one injuring the other. In such an embodiment, each animal has an apparatus and each apparatus is able to communicate with the other to determine which animal receives the stimulus.

The apparatus may be used for a wide variety of animals whether wild or domesticated and includes, for example, bovine, equine, ovine, and primates.

In a second aspect the invention is a method for the virtual fencing of an animal, comprising:

determining the position of an animal relative to a target and whether the animal is moving relative to the target;

determining a distance between the animal and the target;

applying a stimulus to the animal if the distance between the animal and the target is less than a predetermined distance and if the animal is moving in a direction towards the target; and withdrawing the application of the stimulus to the animal when the animal either stops, retreats from the target, or accelerates whilst the distance between the animal and the target is less than the predetermined distance.

Retreating from the target may include backing up and/or tong in a direction away from the target.

The method may further comprise executing software to determine when to apply the stimulus and when to remove the application of the stimulus.

The method may further comprise executing software to determine one or more of whether a stimulus is to be applied, at what intensity to apply the stimulus, and what type of stimulus is to be applied.

The method may further comprise executing software to determine whether to remove the stimulus based on the animal's real-time response to the stimulus.

The method may further include modifying whether to remove the stimulus based on the animal's real-time response to the stimulus on the animal's response to previous removal of stimuli.

The method may further comprise remotely receiving information which relates to the position of the animal relative to the target.

The method may further comprise receiving information relating to the gait of the animal.

The method may further comprise receiving information relating to the orientation of the animal.

The method may further comprise storing real time measurements including one or more of the position of the animal relative to the target, whether the animal is moving relative to the target, the gait of the animal, the orientation of the animal, when a stimulus has been applied, at what intensity a stimulus has been applied, what type of stimulus has been applied and how frequently a stimulus has been applied.

The method may further comprise determining the shortest distance between the animal and the target.

The method may further comprise storing a data record in real time of the animal's response to the application of the stimulus. The method may further comprise forming a historical record of the animal's response to the stimulus.

In a third aspect, the invention is a software program for the virtual fencing of an animal, where the software program is executable by a microprocessor which operates to continuously determine the position of an animal relative to a target and to determine whether the animal is moving relative to the target;

wherein the software program is operable, on receiving data from the microprocessor indicating that the distance between the animal and the target is less than a predetermined distance and that the animal is moving in a direction towards the target, to determine when to apply a stimulus to the animal and to determine when to remove the application of the stimulus.

Removal of the application of the stimulus may be based on a determination that the animal has either stopped, retreated from the target, or accelerated whilst the distance between the animal and the target is less than the predetermined distance.

The software program may determine one or more of, at what intensity to apply the stimulus, and what type of stimulus is to be applied.

The software program may determine when to remove the stimulus based on the animal's response to the stimulus.

The software program may modify whether to remove the stimulus based on a historical record of the animal's response to stimuli.

An advantage of at least one embodiment of the invention is that an animal may be able to associate the application of a stimulus with movement and develop an understanding of the desired response. In particular, the animal may be able to understand and learn through avoidance conditioning, to associate the application of the electrical stimulus with movement toward a target and be rewarded immediately by release of the stimulus when a desired response is shown, i.e., to stop moving toward the target, back up or turn away from the target. This is more sophisticated than simply withdrawing stimuli in the event that an animal becomes trapped in a zone. Real time processing of information enables the application and withdrawal of the stimulus to be consistently matched to an animal's change in movements.

Advantageously, in accordance with at least one embodiment of the invention, removal of the stimulus is based on detected changes in the animal's velocity.

BRIEF DESCRIPTION OF THE DRAWINGS

An example of the invention will now be described with reference to the accompanying drawings in which.

DETAILED DESCRIPTION OF EXEMPLARY EMBODIMENTS

Figure 1:
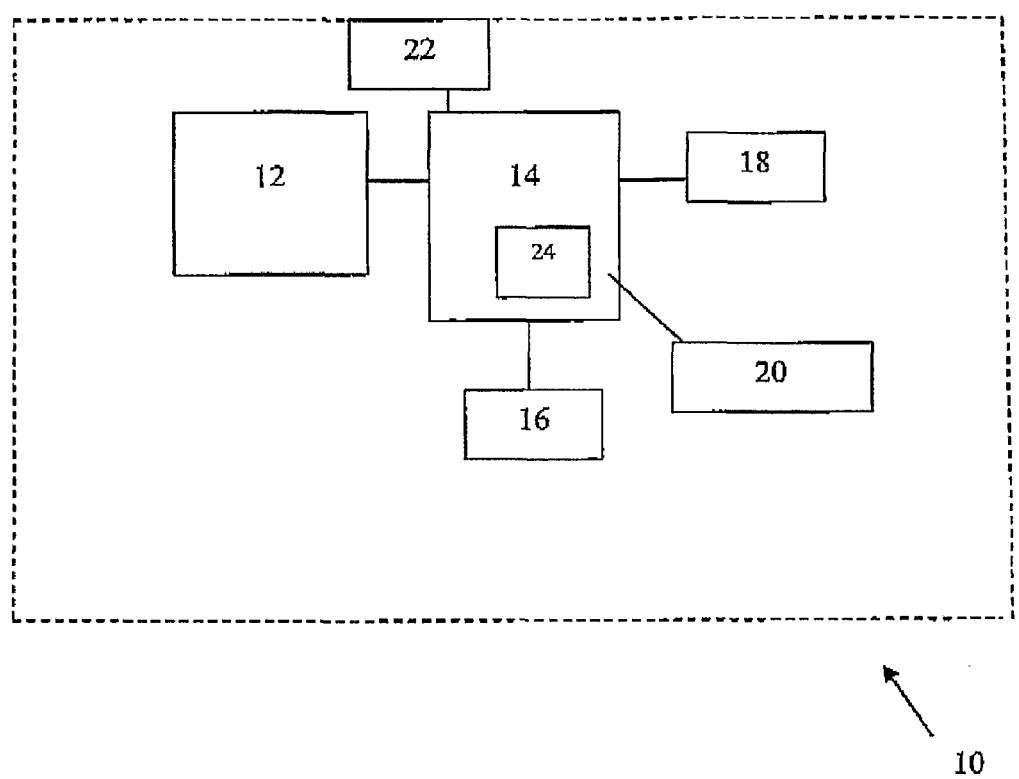
FIG. 1 illustrates a block diagram of an apparatus for the virtual fencing of an animal.

FIG. 1 illustrates a schematic diagram of an apparatus 10 for the virtual fencing of an animal. The apparatus 10, is intended to be securely fitted to a collar (not shown) which is worn around an animal's neck (also not shown).

The apparatus 10 includes a stimulus unit 12 effective for applying an electric shock to the top of the animal's neck. A Microprocessor 14, is provided which operates to control the stimulus unit 12. The microprocessor 14, further operates in conjunction with accelerometers 16, the latter of which is provided to enable small changes in velocity to be detected. The apparatus 10, also includes a module in the form of a GPS receiver 20 which is in communication with the microprocessor 14. Signals received by the receiver 20 are input to the microprocessor 14 which then determines the location of the animal relative to a target. An electronic compass 18 is further provided to determine the direction of small movements made by the animal.

The training of the animal is based on avoidance conditioning and a critical component is the timing of stimulus application and withdrawal so that the animal understands that its actions of moving into an exclusion zone are associated with receiving an aversive stimulus. In this regard, the combined function of the accelerometers 16, compass 18 and GPS 20 enables consistent timing of the application of the stimulus when the animal enters an exclusion zone and the immediate release of the stimulus at the appropriate time to provide the animal with an opportunity to recognise and learn the desired behavior.

Associated with the microprocessor 14 is a memory 24 to store data which includes a historical record of the data. Real time measurements from the GPS, accelerometers and electronic compass are stored together with when a stimulus has been applied, at what intensity a stimulus has been applied, the type of stimulus which has been applied, and how frequently a stimulus has been applied. Further data fields include the predetermined distance which is used as a reference to determine whether the animal has entered the exclusion zone; the type of animal, and a maximum duration for application of the stimulus. Any of these parameters may be remotely deactivated depending on the type of animal to which the device is applied.

The microprocessor executes software 22 crying out algorithms to determine whether a stimulus is to be applied, the type and at what intensity to apply the stimulus, when to apply the stimulus and when to remove the application of the stimulus.

In particular, the decision on whether to remove the stimulus is based on the animal's real-time response to the stimulus. In addition, the decision criteria may be modified based on the animal's response to previous application and removal of stimuli. This is effected by use of a control algorithm which employs pattern recognition.

Experimental Results

In order to establish the capability of the system, the apparatus 10 was modeled using a trained operator to control the duration of stimulus. Two experiments were initially conducted to test the apparatus 10.

The first experiment involved a trial which was conducted on twelve heifers. For a period of two weeks prior to the trial, the heifers were kept in a paddock and trained to approach and feed from a feeder containing lucerne hay. During the trial, individual animals were released into the paddock with lucerne hay offered from the feeder used in training. Animal movements were monitored by GPS. An exclusion zone was designated which consisted of a region within approximately five meters of the feeder.

When an animal entered the exclusion zone an electrical stimulus was applied to the animal. The stimulus ceased when the animal ceased moving fiber into the exclusion zone. The level of stimulus was deliberately set at a relatively low level to observe variation in response between the animals. The stimulus was consistently delivered, was sharp and intense and coincided substantially immediately with the undesirable behaviour. It was found that 8.3% of animals failed to stop in response to the signal and continued to move toward the feeder and eat the feed offered. On the first day, the duration of stimulus required to stop the remaining animals varied between about 0.3 and 2.9 seconds (a mean of 1.2 seconds). When the same animals were tested on the following day, the duration required to prevent access to the feeder varied between 0.8 and 2.4 seconds (a mean of 1.4 seconds).

The number of times stimuli was required to be applied for animals to learn not to approach the feeder was reduced by 20% between the first and second days. After an average application of three stimuli per day, animals learned not to approach the feeder.

In the second experiment, a trial was conducted on six bulls over three successive days. Bulls were equipped with GPS collars and pairs of bulls who were not known to each other were released into a paddock along with a cow in oestrous. Under such conditions bulls typically approach each other to determine a dominance hierarchy, often by fighting. In the trial, electrical stimuli were used to prevent the bulls from approaching and making contact with each other. Stimuli were applied to the bull that was actively approaching the other bull. The application of stimuli ceased when the bull ceased to move towards the other bull. In 98% of cases, (eighty out of eighty one approaches), the use of stimuli was successful in preventing the bull from moving towards the other bull. It was found that the bulls that stopped required up to five seconds of stimuli (with a mean of 1.8 seconds). Over subsequent days when the same pairs of bulls were tested, the number of stimuli applied to prevent bulls making contact with other bulls was reduced. On the first day, stimuli was required to be applied sixty two times, and this decreased to eight times and eleven times on the second and third days respectively. The duration of application on the second day varied between 1.0 to 5.0 seconds (with a mean of 2.1 seconds) and this was reduced on the third day to between 0.1 and 3.0 seconds (with a mean of 1.3 s).

The results of the two experiments demonstrate several significant factors. First, that the duration of stimulus required to stop an animal moving varies between animals. Further, that animals may remain a constant distance into the exclusion zone without moving for varying amounts of time, and that an animal rapidly learns to associate the stimulus with either a fixed location or another animal. Furthermore, the experiments demonstrate that the strategy of applying the stimuli only until the animal stops movement further into the exclusion zone is an effective method of controlling the majority of animal movement.

Since there is a large variation in the behavioural response of individual animals to electrical stimuli a third experiment, a feed attract experiment, conducted on twelve heifers was performed to test animal learning. Similar to the first experiment, for a period of two weeks prior to the experiment, the heifers were kept in the paddock and trained to approach and feed from the feeder containing lucerne hay. Each animal in the feed attractant experiment was tested a total of four times; on days 1, 7, 14 and 225.

During the experiment, individual animals were released into the paddock with lucerne hay offered from the feeder used in training. A continuous stimuli was applied when the animal entered the exclusion zone. When the animal stopped moving further into the exclusion zone, the stimulus ceased immediately. The behaviours displayed by the heifers in response to receiving the electrical stimuli were categorized as (1) turning (away from the direction of the feeder), (2) backing up (moving backwards away from the feeder), (3) stopping (ceases moving in any direction for at least two seconds, and (4) forward (continues to move further into the EZ). In response to the electrical stimuli, 44% of animals turned away from the feeder, 26% backed up, 15% stopped and 15% proceeded to move forward (accelerate).

In response to the large variation in the behavioural response of individual animals to electrical stimuli animal behavioural principles have been advantageously incorporated into embodiments of the invention. The timing, duration and consistency of the stimulus application are of high importance in enabling the animal to understand and learn the desired response. The response of cattle to electrical stimuli is highly varied, yet despite this, it is possible to control the movement of cattle and prevent them from gaining access to an area that they desire to reach, through application of appropriately timed electrical stimuli. The results of the experiments in which electrical stimuli is used as a negative reinforcement so that removal of the aversive stimulus leads to increase in the performance of the desired behaviour are discussed below.

Stimuli applied for a longer duration were required to prevent heifers from accessing the feeder on the first day of testing (day 1, 3.3 s) than on the third time (day 14, 1.8 s). The heifers were able to learn and remember not to approach the feeder as when tested for a fourth time, seven months later, the number of stimuli required to prevent access to the feeder was maintained (day 225, 1.5 s) and the average total duration of stimuli was reduced on day 225 compared with the three prior tests. There were no differences in the average duration of stimuli used over the four testing days.

As mentioned, 15% of heifers in the feed attractant experiment responded to the electrical stimuli by proceeding to accelerate, as if attempting to "escape" from the aversive stimulus. We found it was possible for animals responding by accelerating to be trained to learn the desired behaviour. The modified method incorporates training principles, whereby if upon application of the stimuli, the animal accelerated, whilst remaining within the exclusion zone, and is not focused on the target, then the stimulus ceases. Once the animal stops, if it then proceeds to move in an unfavourable direction, the stimulus is reapplied and this is repeated as necessary. When this method was applied, animals displaying this initial response to the stimulus of accelerating learned the appropriate response and altered their behaviour after two consecutive testing events.

Figure 2:
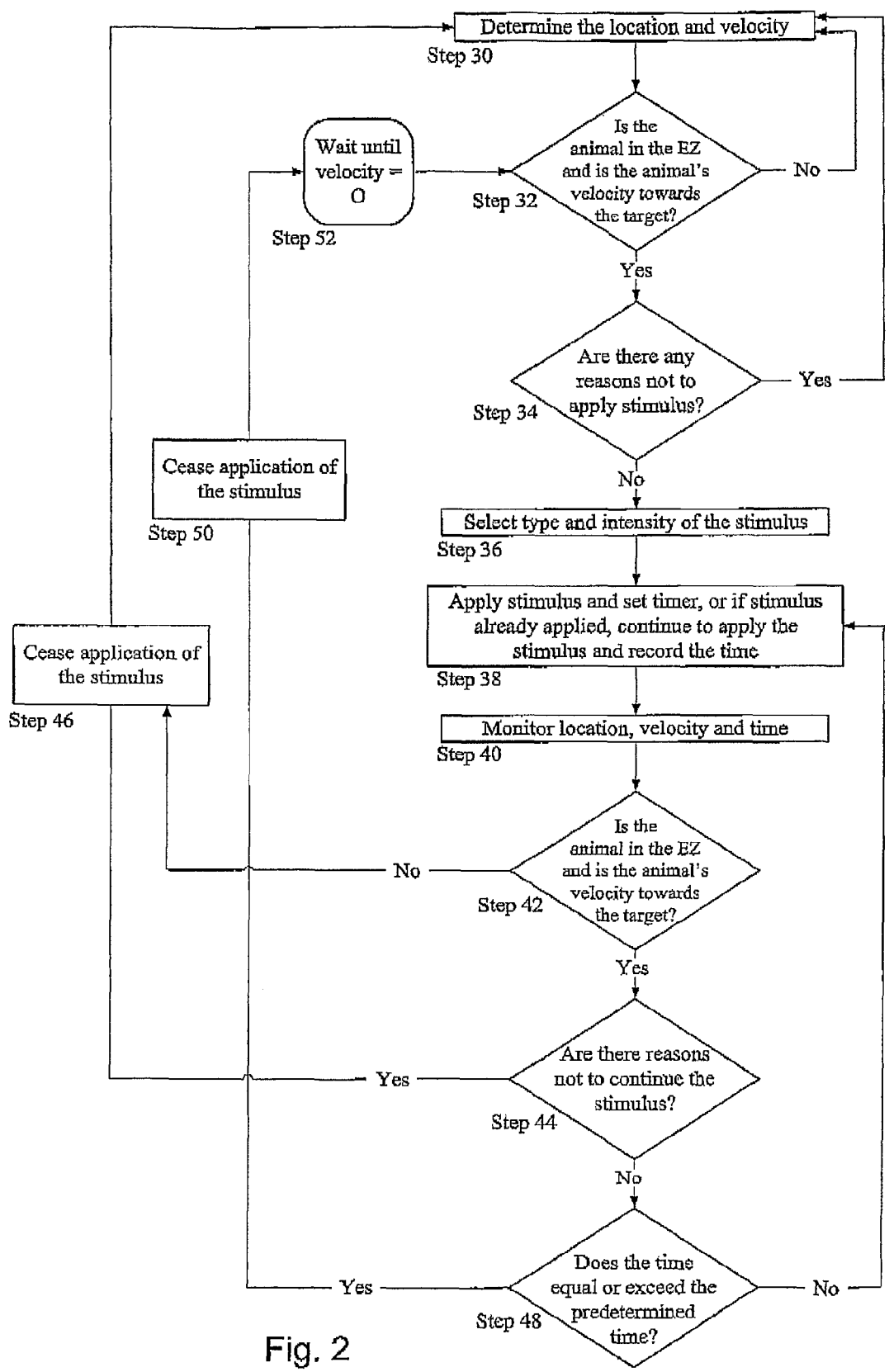
FIG. 2 illustrates a schematic flow chart illustrating the steps used to determine whet to apply the stimulus and when to withdraw the stimulus.

FIG. 2 illustrates a sequence of programmable steps used to determine when to apply the stimulus to the animal and when to withdraw the stimulus. The location and velocity of the animal is determined, step 30, and a determination is made as to whether the animal is in the exclusion zone and whether the animal is moving in a direction towards the target, step 32. If the animal is in the exclusion zone and moving in a direction towards the target, then the software determines whether there axe any reasons not to apply the stimulus, step 34. In light of accumulated knowledge about the particular animal, the software may determine that the particular animal should not be subject to the application of stimuli in which case the cycle loops back to step 30. This loop is applied until the microprocessor determines that a stimulus is to be applied. The software determines the type and intensity at which the stimulus is to be applied, step 36, from stored knowledge in relation to the particular animal's response to previous stimuli. The stimuli is immediately applied and a timer set to determine the duration of application of the stimuli, step 38. The location and velocity of the animal together with the length of time that the stimuli has been applied is monitored continuously, step 40 in order to determine whether the animal is in the exclusion zone and whether the animal is moving in a direction towards the target step 42. In the event that neither of these conditions apply, the application of stimulus ceases, step 46. In the event that the animal is in the exclusion zone and is moving in a direction towards the target the software determines whether there are any reasons not continue to apply stimulus, step 44. In light of the stored accumulated knowledge about the particular anal, the microprocessor may determine that the particular animal should not be subject to any further continued application of stimuli. This may be a result of the animal having accelerated in response to the stimulus. In this case the application of stimuli immediately ceases, step 46, and the cycle then repeats itself step 30.

If the microprocessor determines that there are no reasons not to continue the application of stimuli, the software determines whether the elapsed time equals or exceeds the predetermined time, step 48. The predetermined time is a cut out time which in this case is dependent on the type of animal and the animal's behavioural history to the application of stimuli. In the event that the elapsed time has not reached or exceeded the predetermined time then the cycle loops back to step 38. In the event that the elapsed time has reached or exceeded the predetermined time the application of stimuli is immediately ceased, step 50. The software waits until the animal's velocity is zero, or close to zero. The cycle then loops back to step 32.

The combination of the microprocessor 14 with its inbuilt logic circuitry and memory 24 enables the apparatus to alter its response based on the history of knowledge that it has stored about the animal over time. The relationship between the animal and the apparatus 10 is therefore bi-directional and forms a feed back loop.

The importance of the intelligent logic of the apparatus and the fling of the application of the stimulus was highlighted in a further experiment comparing a naïve method with the method of animal control in accordance with the invention. In this experiment twenty heifers were tested using the feed attractant model described above. The method, where the stimulus is applied when an animal enters the exclusion zone and is stopped when the animal ceased moving further into the exclusion zone, resulted in 20% of the animals (2 out of 10) reaching the feeder. The naïve method, where the stimuli was continuously applied if the animal was in the exclusion zone, for a maximum duration and cut off after five seconds, with no consideration of its response, resulted in all ten animals reaching the feeder.

When a cross-over study was conducted, involving re-testing each animal using the method in accordance with the invention, the heifers that had been tested previously using the naïve method, all exhibited problematic behaviours and responded to the stimuli by running forward as if to "escape" the stimulus. The lack of understanding by the animal due to the naïve method failing to incorporate animal training principles inhibits the desired response and way compromise welfare.

In the majority of cases, the animal was able to understand and associate the electrical stimulus with movement toward a feeder and be rewarded immediately by release of the stimulus when a desired response was shown.

It is envisioned that the apparatus will likely make virtual fencing an economically viable option.

The resolution of the location of an animal may depend on the sophistication of the GPS unit used. Of course GPS units with higher update rates and differential correction will yield better resolution than those without.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. An apparatus for the virtual fencing of an animal, said apparatus comprising:
   a microprocessor configured to continuously determine the position of an animal relative to a target and to determine whether the animal is moving relative to the target; and a stimulus unit for applying a sensory stimulus to the animal in response to signals received from the microprocessor;

wherein the microprocessor configuration is programmed such that if the distance between the animal and the target is less than a predetermined distance and, if the animal is moving in a direction towards the target, a stimulus is applied to the animal and the microprocessor configuration is further programmed to:

withdraw the stimulus when the animal stops while the distance between the animal and the target is less than the predetermined distance;

withdraw the stimulus when the animal retreats from the target while the distance between the animal and the target is less than the predetermined distance; and withdraw the stimulus when the animal accelerates while the distance between the animal and the target is less than the predetermined distance.

2. An apparatus according to claim 1, where the microprocessor executes a computer program to determine when to apply the stimulus and when to remove the application of the stimulus.

3. An apparatus according to claim 2, where the computer program is executable to determine one or more of whether a stimulus is to be applied, at what intensity to apply the stimulus, and what type of stimulus is to be applied.

4. An apparatus according to claim 3, where the determination of when to remove the stimulus is based on the animal's real time response to stimuli.

5. An apparatus according to claim 4, where the determination criteria is modified based on a historical record of the animal's response to stimuli.

6. An apparatus according to claim 1, further comprising a wireless receiver for receiving information relating to the position of the animal relative to the target.

7. An apparatus according to claim 6, where the wireless receiver is a global positioning system (GPS) receiver.

8. An apparatus according to claim 1, further comprising an accelerometer for detecting changes in the animal's velocity.

9. An apparatus according to claim 8, where the microprocessor receives data from the accelerometer to determine the animal's gait.

10. An apparatus according to claim 1, further comprising a magnetic sensor or an electronic compass for increasing the resolution of the animal's orientation.

11. An apparatus according to claim 1, where the microprocessor operates in conjunction with a remote processor for controlling the application of the stimulus.

12. An apparatus according to claim 11, where a signal output from the remote processor is transmitted to the microprocessor via a wireless link.

13. An apparatus according to claim 1, where the target is a stationary target.

14. An apparatus according to claim 13, where the target is an imaginary boundary and the microprocessor operates to determine the shortest distance between the animal and the boundary.

15. An apparatus according to claim 1, where the target is a moving, or potentially moving, target.

16. An apparatus according to claim 1, where the stimulus to be applied to an animal is one or more of an electrical stimulus, an audible stimulus, a vibrational stimulus, and a pinching or pricking of the animal's skin.

17. An apparatus according to claim 1, comprising a memory associated with the microprocessor to store data.

18. An apparatus according to claim 17, where the data includes one or more of, real time measurements of the position of the animal relative to the target and the velocity of the animal relative to the target, when a stimulus has been applied, at what intensity a stimulus has been applied, what type of stimulus has been applied and how frequently a stimulus has been applied.

19. A method for the virtual fencing of an animal, said method comprising:

determining the position of an animal relative to a target and whether the animal is moving relative to the target;

determining a distance between the animal and the target;

applying a stimulus to the animal if the distance between the animal and the target is less than a predetermined distance and if the animal is moving in a direction towards the target;

withdrawing the stimulus when the animal stops while the distance between the animal and the target is less than the predetermined distance;

withdrawing the stimulus when the animal retreats from the target while the distance between the animal and the target is less than the predetermined distance; and withdrawing the stimulus when the animal accelerates while the distance between the animal and the target is less than the predetermined distance.

20. The method according to claim 19, further comprising executing a computer program to determine when to apply the stimulus and when to remove the application of the stimulus.

21. The method according to claim 20, further comprising executing a computer program to determine one or more of whether a stimulus is to be applied, at what intensity to apply the stimulus, and what type of stimulus is to be applied.

22. The method according to claim 19, further comprising executing a computer program to determine when to remove the stimulus based on the animal's real time response to the stimulus.

23. The method according to claim 22, further comprising modifying when to remove the stimulus based on a historical record of the animal's response to stimuli.

24. The method according to claim 19, further comprising remotely receiving information which relates to the position of the animal relative to the target.

25. The method according to claim 19, further comprising receiving information relating to the gait of the animal.

26. The method according to claim 19, further comprising receiving information relating to the orientation of the animal.

27. The method according to claim 19, further comprising:

storing data including one or more of the position of the animal relative to the target, whether the animal is moving relative to the target, the gait of the animal, the orientation of the animal, when a stimulus has been applied, at what intensity a stimulus has been applied, what type of stimulus has been applied and how frequently a stimulus has been applied.

28. The method according to claim 19, further comprising determining the shortest distance between the animal and the target.

29. A computer-readable storage medium containing a computer program for the virtual fencing of an animal, where the program is executable by a microprocessor which operates to continuously determine the position of an animal relative to a target and to determine whether the animal is moving relative to the target;

wherein the program is selectively operable, on receiving data indicating that the distance between the animal and the target is less than a predetermined distance and that the animal is moving in a direction towards the target, to authorize application of a stimulus to the animal, and on receiving data indicating that the animal has stopped while the distance between the animal and the target is less than the predetermined distance, to authorize removal of the applied stimulus and on, receiving data indicating that the animal has retreated from the target while the distance between the animal and the target is less than the predetermined distance, to authorize removal of the applied stimulus and, on receiving data indicating that the animal has accelerated while the distance between the animal and the target is less than the predetermined distance, to authorize removal of the applied stimulus.

30. A computer-readable storage medium according to claim 29 where the program determines at what intensity to apply the stimulus and what type of stimulus is to be applied.

31. A computer-readable storage medium according to claim 29, where the program determines when to remove the stimulus based on the animal's real time response to the stimulus.

32. A computer-readable storage medium according to claim 31, where the program modifies when to remove the stimulus based on a historical record of the animal's response to stimuli.

* * * * *